US008813472B2

(12) United States Patent
West et al.

(10) Patent No.: US 8,813,472 B2
(45) Date of Patent: Aug. 26, 2014

(54) SYSTEM AND METHOD FOR CONTROLLING A SEMI-CLOSED POWER CYCLE SYSTEM

(75) Inventors: James Anthony West, Simpsonville, SC (US); Alan Meier Truesdale, Greenville, SC (US)

(73) Assignee: General Electric Company, Schenectady, NY (US)

( * ) Notice: Subject to any disclaimer, the term of this patent is extended or adjusted under 35 U.S.C. 154(b) by 979 days.

(21) Appl. No.: 12/909,768

(22) Filed: Oct. 21, 2010

(65) Prior Publication Data

US 2012/0096829 A1  Apr. 26, 2012

(51) Int. Cl.
F02C 9/00 (2006.01)
F02C 9/48 (2006.01)

(52) U.S. Cl.
USPC ........... 60/39.52; 60/792; 60/39.281; 60/795; 60/785; 60/269; 60/262; 60/238; 60/240; 60/39.24

(58) Field of Classification Search
USPC ........ 60/792, 39.25, 39.27, 39.281, 794, 795, 60/782, 785, 262, 269, 238, 240, 39.52
See application file for complete search history.

(56) References Cited

U.S. PATENT DOCUMENTS

| | | | | |
|---|---|---|---|---|
| 3,815,561 A * | 6/1974 | Seitz | | 123/696 |
| 4,528,811 A * | 7/1985 | Stahl | | 60/784 |
| 6,202,400 B1 * | 3/2001 | Utamura et al. | | 60/773 |
| 6,269,624 B1 * | 8/2001 | Frutschi et al. | | 60/783 |
| 6,389,796 B1 * | 5/2002 | Mandai et al. | | 60/39.182 |
| 6,598,402 B2 * | 7/2003 | Kataoka et al. | | 60/775 |
| 6,622,470 B2 * | 9/2003 | Viteri et al. | | 60/39.52 |
| 7,089,745 B2 * | 8/2006 | Roby et al. | | 60/776 |
| 7,266,940 B2 * | 9/2007 | Balan et al. | | 60/39.181 |
| 7,617,687 B2 | 11/2009 | West et al. | | |
| 7,784,288 B2 | 8/2010 | Thatcher et al. | | |
| 2006/0196190 A1 * | 9/2006 | Arar et al. | | 60/773 |
| 2009/0056334 A1 | 3/2009 | West et al. | | |
| 2009/0158734 A1 | 6/2009 | West et al. | | |

FOREIGN PATENT DOCUMENTS

| | | |
|---|---|---|
| DE | 3425115 A1 | 1/1986 |
| EP | 0887530 A2 | 12/1998 |
| EP | 1091095 A2 | 4/2001 |
| GB | 2140873 A | 12/1984 |
| WO | 2008155242 A1 | 12/2008 |

OTHER PUBLICATIONS

Search Report from FR Application No. 1159467 dated Mar. 6, 2013.

* cited by examiner

*Primary Examiner* — Phutthiwat Wongwian
*Assistant Examiner* — Steven Sutherland
(74) *Attorney, Agent, or Firm* — Fletcher Yoder, P.C.

(57) ABSTRACT

A system includes a controller configured to control a semi-closed power cycle system. The controller is configured to receive at least one of a first signal indicative of an oxygen concentration within a first gas flow through a primary compressor, a second signal indicative of power output by the semi-closed power cycle system, a third signal indicative of a temperature of a second gas flow through a turbine, and a fourth signal indicative of a mass flow balance within the semi-closed power cycle system. The controller is also configured to adjust at least one of the first gas flow through the primary compressor, a fuel flow into a combustor, a fraction of the first gas flow extracted from the primary compressor, and an air flow through a feed compressor based on the at least one of the first signal, the second signal, the third signal, and the fourth signal.

20 Claims, 3 Drawing Sheets

SYSTEM AND METHOD FOR CONTROLLING A SEMI-CLOSED POWER CYCLE SYSTEM

BACKGROUND OF THE INVENTION

The disclosed subject matter relates to a system and method for controlling a semi-closed power cycle system.

Certain power generation systems include a gas turbine engine configured to combust a mixture of fuel and compressed air to produce hot combustion gases. The combustion gases flow through a turbine to generate power for a load, such as an electric generator. Certain gas turbine engines include a combustor configured to operate with a fuel-lean mixture ratio. Accordingly, the quantity of compressed air fed into the combustor is greater than the quantity sufficient for complete combustion of the fuel. As a result, the exhaust gas from the combustor contains a significant quantity of oxygen.

Exhaust gas from certain power generation systems may be employed for secondary recovery of minerals, such as oil. In such systems, pressurized exhaust gas is directed into mineral deposits within the earth to increase oil pressure and/or to fracture geologic formations, thereby enhancing oil recovery. In addition, because the exhaust gas remains within the geologic formation, at least a portion of the carbon dioxide produced by the power generation system will be captured within the earth. Unfortunately, the oxygen within the exhaust gas may degrade and/or otherwise adversely affect the quality of the oil. Therefore, it may be desirable to substantially reduce the oxygen concentration of the exhaust gas from the gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a controller configured to control a semi-closed power cycle system. The controller is configured to receive at least one of a first signal indicative of an oxygen concentration within a first gas flow through a primary compressor, a second signal indicative of power output by the semi-closed power cycle system, a third signal indicative of a temperature of a second gas flow through a turbine, and a fourth signal indicative of a mass flow balance within the semi-closed power cycle system. The controller is also configured to adjust at least one of the first gas flow through the primary compressor, a fuel flow into a combustor, a fraction of the first gas flow extracted from the primary compressor, and an air flow through a feed compressor based on the at least one of the first signal, the second signal, the third signal, and the fourth signal.

In a second embodiment, a system includes a combustor configured to combust a fuel-air mixture, and a feed compressor in fluid communication with the combustor and configured to provide an air flow to the combustor. The system also includes a turbine in fluid communication with the combustor and configured to receive a first gas flow from the combustor. The system further includes a primary compressor in fluid communication with the turbine and configured to receive a second gas flow from the turbine, to compress the second gas flow, and to provide a third gas flow to the turbine. A fraction of the third gas flow is extracted from the primary compressor. Furthermore, the system includes a controller configured to receive a first signal indicative of an oxygen concentration within the third gas flow, and to adjust the air flow to the combustor based on the first signal.

In a third embodiment, a method for controlling a semi-closed power cycle system includes receiving at least one of a first signal indicative of an oxygen concentration within a first gas flow through a primary compressor, a second signal indicative of power output by the semi-closed power cycle system, a third signal indicative of a temperature of a second gas flow through a turbine, and a fourth signal indicative of a mass flow balance within the semi-closed power cycle system. The method also includes adjusting at least one of the first gas flow through the primary compressor, a fuel flow into a combustor, a fraction of the first gas flow extracted from the primary compressor, and an air flow through a feed compressor based on the at least one of the first signal, the second signal, the third signal, and the fourth signal.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
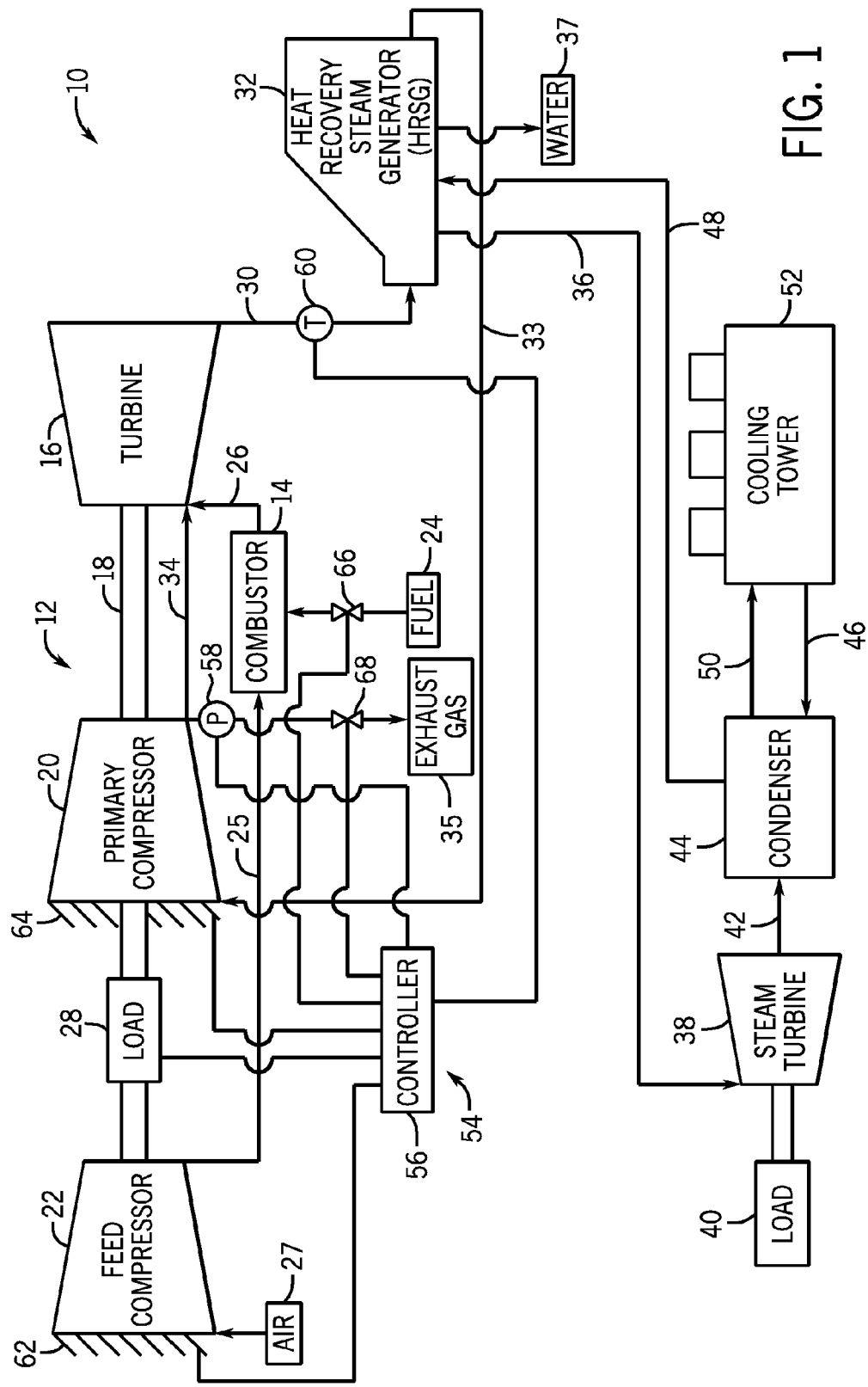
FIG. 1 is a schematic diagram of an exemplary combined cycle power generation system including an embodiment of a semi-closed power cycle system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain gas turbine engines are configured to operate based on a semi-closed power cycle to substantially reduce the oxygen concentration within the exhaust gas. Such gas turbine engines may be described as semi-closed power cycle systems. Certain semi-closed power cycle systems include a feed compressor configured to provide an air flow to a combustor, a turbine configured to receive a flow of gas from the combustor, and a primary compressor configured to receive the gas flow output from the turbine, to compress the gas, and to provide a compressed gas flow back into the turbine. The recirculated gas provided by the primary compressor substantially reduces the temperature of the gas discharged from the combustor, thereby enabling the combustor to operate with a substantially stoichiometric fuel-air mixture ratio. As a result, the oxygen content of the exhaust gas extracted from the primary compressor will be substantially reduced compared to certain gas turbine engines which operate the combustor with a fuel-lean mixture ratio. Consequently, semi-closed power cycle systems may efficiently provide exhaust gas well-suited for secondary recovery and/or carbon capture operations.

Embodiments of the present disclosure may facilitate efficient operation of a semi-closed power cycle system by controlling various fluid flows within the semi-closed power cycle system. For example, certain semi-closed power cycle systems include a controller configured to receive a first signal indicative of an oxygen concentration within the gas flow from the primary compressor, and to adjust the air flow to the combustor based on the first signal. In further embodiments, the controller is configured to receive a second signal indicative of power output by the turbine, a third signal indicative of a temperature of the gas flow through the turbine, and a fourth signal indicative of a mass flow balance within the system. The controller is also configured to adjust the air flow to the combustor, to adjust the gas flow into the primary compressor, to adjust a fuel flow into the combustor, and to adjust the fraction of the gas flow extracted from the primary compressor based on the first signal, the second signal, the third signal, and the fourth signal. For example, the controller may be configured to adjust the gas flow into the primary compressor based on the third signal, to adjust the fuel flow into the combustor based on the second signal, to adjust the fraction of the gas flow extracted from the primary compressor based on the fourth signal, and to adjust the air flow to the combustor based on the first signal. Alternatively, the controller may be configured to adjust the gas flow into the primary compressor based on the third signal, to adjust the fuel flow into the combustor based on the first signal, to adjust the fraction of the gas flow extracted from the primary compressor based on the second signal, and to adjust the air flow to the combustor based on the fourth signal. Consequently, the controller may facilitate efficient operation of the semi-closed power cycle system.

FIG. 1 is a schematic diagram of an exemplary combined cycle power generation system 10 including an embodiment of a semi-closed power cycle system 12. The combined cycle power generation system 10 is described below for the purpose of providing context for embodiments of the semi-closed power cycle system 12. It should be appreciated that the semi-closed power cycle system 12 described below may be utilized for driving a load within other power generation systems, turbine systems, or processing plants, for example. In the present embodiment, the semi-closed power cycle system 12 includes a combustor 14, a turbine 16, a drive shaft 18, a primary compressor 20, and a feed compressor 22. The combustor 14 receives fuel 24, such as natural gas, which may be injected under pressure from fuel nozzles. This fuel is mixed with compressed air 25 and combusted within the combustor 14, thereby generating hot pressurized gases 26. The combustor 14 directs the gases 26 toward an inlet of the turbine 16. As the gases 26 from the combustor 14 pass through the turbine 16, blades in the turbine 16 are driven to rotate, thereby rotating the drive shaft 18 along an axis of the semi-closed power cycle system 12. As illustrated, the drive shaft 18 is connected to various components of the semi-closed power cycle system 12, including the primary compressor 20 and the feed compressor 22.

The drive shaft 18 connects the turbine 16 to a rotor of the feed compressor 22 which includes blades. Thus, rotation of turbine blades in the turbine 16 causes the drive shaft 18 connecting the turbine 16 to the feed compressor 22 to rotate blades within the feed compressor 22. The rotation of blades in the feed compressor 22 causes the compressor 22 to compress air 27 received via an air intake, for example. The compressed air 25 is then fed to the combustor 14 and mixed with the fuel 24 to facilitate combustion. The drive shaft 18 is also connected to a load 28, which may be a stationary load, such as an electrical generator, for producing electrical power in a power plant. Indeed, the load 28 may be any suitable device that is powered by the rotational output of the semi-closed power cycle system 12.

Gas 30 from the turbine 16 is directed to a heat recovery steam generator (HRSG) 32. The HRSG 32 is a heat exchanger which includes multiple conduits configured to convey a secondary fluid, such as water, in a direction crosswise (e.g., substantially perpendicular) to the flow of gas 30 through the HRSG 32. As the gas 30 flows across the conduits, heat is transferred from the gas to the water, thereby producing steam. In addition, the temperature of the gas is significantly reduced. After passing through the HRSG 32, the cooled gas 33 is directed toward an intake of the primary compressor 20 such that the gas 33 may be recirculated through the semi-closed power cycle system 12.

As illustrated, the drive shaft 18 connects the turbine 16 to a rotor of the primary compressor 20 which includes blades. Thus, rotation of turbine blades in the turbine 16 causes the drive shaft 18 connecting the turbine 16 to the primary compressor 20 to rotate blades within the primary compressor 20. The rotation of blades in the primary compressor 20 causes the compressor 20 to compress the cool gas 33. The compressed gas 34 is then fed into the turbine 16 to reduce the temperature of the gas 26 from the combustor 14. For example, the combustor 14 may be configured to operate with a stoichiometric fuel-air mixture ratio. In certain embodiments, the temperature of the gas 26 from a stoichiometric reaction may be greater than the desired operational temperature of the turbine 16. Consequently, mixing the gas 26 from the combustor 14 with the recirculated gas 34 may provide the turbine 16 with a gas flow at a desired temperature. In addition, because the gas 26 is the product of a stoichiometric combustion reaction (e.g., complete combustion of the fuel and air), the oxygen content of the gas 26 will be substantially lower than gas from a fuel-lean combustion reaction. For example, fuel-lean combustion reactions may produce gas having an oxygen concentration greater than approximately 10%, 12%, 14%, 16%, 18%, 20%, or more. In contrast, the oxygen concentration of the gas 26 from the stoichiometric combustion reaction may be less than approximately 5%, 4%, 3%, 2%, 1%, or less.

In the present embodiment, a portion of the gas 34 expelled from the primary compressor 20 is extracted for use within secondary recovery and/or carbon capture operations. As discussed in detail below, the fraction of gas extracted may be particularly adjusted to maintain a mass flow balance within the semi-closed power cycle system 12, to vary rotational output to the load 28 and/or to affect other operational parameters of the semi-closed power cycle system 12. Due to the low oxygen content of the extracted exhaust gas 35, the exhaust gas 35 may be injected into a mineral deposit without substantially degrading and/or otherwise adversely affecting the quality of the minerals (e.g., oil). As a result, the exhaust gas 35 from the semi-closed power cycle system 12 may be well-suited for secondary recovery and/or carbon capture operations.

As previously discussed, gas 30 from the turbine 16 is fed into the HRSG 32, and cooled gas 33 is returned to the primary compressor 20. As the gas 30 is cooled within the HRSG 32, water vapor within the gas 30 will condense into water 37. The water 37 may be extracted from the HRSG 32, thereby reducing the moisture content of the gas 33. As a result, the exhaust gas 35 extracted from the primary compressor 20 will have a significantly lower water concentration than exhaust gas expelled directly from a gas turbine engine.

In the illustrated embodiment, high pressure steam 36 generated by the flow of hot gas 30 through the HRSG 32 is directed toward a steam turbine 38. As the high pressure steam 36 passes through the steam turbine 38, blades within the turbine 38 are driven to rotate, thereby driving a second load 40. While the present embodiment includes two loads 28 and 40, it should be appreciated that the semi-closed power cycle system 12 and the steam turbine 38 may be coupled to the same load in alternative embodiments. As the steam passes through the steam turbine 38, the pressure is reduced such that low pressure steam 42 is expelled from the turbine 38. As illustrated, the low pressure steam 42 flows into a condenser 44 which condenses the steam. The condenser 44 is a heat exchanger which includes multiple conduits configured to convey a secondary fluid, such as water, in a direction crosswise (e.g., substantially perpendicular) to the flow of steam. As the steam flows across the conduits, heat from the steam is transferred to water 46, thereby condensing the steam into water 48. The water 48 flows back to the HRSG 32 where it is heated by the gas 30 to produce more high pressure steam 36. The cooling water 46 is heated within the condenser 44 and exits as hot water 50. The hot water 50 is directed toward a cooling tower 52 which cools the hot water 50 to produce cool water 46 for the condenser 44. While the high pressure steam 36 is directed toward a steam turbine 38 in the present embodiment, it should be appreciated that alternative embodiments may utilize the high pressure steam 36 for an industrial process (e.g., gasification) before returning the low pressure steam 42 to the condenser 44.

In the illustrated embodiment, the power generation system 10 includes a control system 54 configured to regulate operation of the semi-closed power cycle system 12. As illustrated, the control system 54 includes a controller 56 configured to receive signals indicative of various operational parameters of the semi-closed power cycle system 12, and to control fluid flow throughout the semi-closed power cycle system 12 to facilitate efficient operation. In certain embodiments, the controller 56 is configured to receive at least one of a signal indicative of an oxygen concentration within the gas flow 34 from the primary compressor 20, a signal indicative of power output by the semi-closed power cycle system 12, a signal indicative of a temperature of the gas flow 30 from the turbine 16, and a signal indicative of a mass flow balance within the semi-closed power cycle system 12. In the illustrated embodiment, the control system 54 includes a sensor 58 in fluid communication with the extracted exhaust gas 35 from the primary compressor 20. The sensor 58 is communicatively coupled to the controller 56 and configured to measure the oxygen concentration and/or the pressure of the extracted exhaust gas 35. As previously discussed, it may be desirable to substantial reduce the oxygen content within the exhaust gas 35 to facilitate secondary recovery and/or carbon capture operations. Consequently, the controller 56 may be configured to receive a signal from the sensor 58 indicative of the oxygen concentration within the exhaust gas 35, and to regulate operation of the semi-closed power cycle system 12 to maintain a low oxygen content within the exhaust gas 35.

In addition, the sensor 58 may be configured to measure the pressure of the exhaust gas 35 extracted from the primary compressor 20. The measured pressure may be utilized to determine the mass flow balance within the semi-closed power cycle system 12. As will be appreciated, maintaining the mass flow balance facilitates efficient operation of the semi-closed power cycle system 12. When the semi-closed power cycle system 12 is mass balanced, the mass flow rate of the exhaust gas 35 extracted from the primary compressor 20 is equal to the mass flow rate of compressed air 25 from the feed compressor 22 plus the mass flow rate of fuel 24 into the combustor 24, minus the mass flow rate of the water 37 extracted from the HRSG 32. If the mass flow rate of exhaust gas 35 is lower than desired, pressure will build within the primary compressor 20, thereby decreasing the efficiency of the semi-closed power cycle system 12. Consequently, by measuring pressure within the exhaust gas 35 discharged from the compressor 20, the controller 56 may determine whether the semi-closed power cycle system 12 is properly mass balanced.

The controller 56 is also communicatively coupled to the load 28 and configured to measure the power output by the semi-closed power cycle system 12. For example, if the load 28 is an electrical generator, the controller 56 may receive a signal indicative of electrical power output of the generator. Consequently, the controller 56 may be configured to control the semi-closed power cycle system 12 to produce a desired power output. In addition, the control system 54 includes a temperature sensor 60 configured to measure the temperature of the gas through the turbine 16. In the illustrated embodiment, the temperature sensor 60 is in fluid communication with the gas 30 at the exit of the turbine 16. However, it should be appreciated that the temperature sensor 60 may be configured to measure the gas temperature at the inlet to the turbine 16 and/or at an intermediate stage of the turbine 16. In the present embodiment, the controller 56 is configured to control the semi-closed power cycle system 12 to produce a desired gas temperature. For example, the controller 56 may be configured to ensure that the temperature of the gas does not exceed the maximum operating temperature of the turbine 16.

In the present embodiment, the controller 56 is configured to adjust at least one of the gas flow through the primary compressor 20, a flow of fuel 24 into the combustor 14, a fraction of the exhaust gas flow 35 extracted from the primary compressor 20, and the air flow through the feed compressor 22 based on at least one of the signal indicative of the oxygen concentration within the gas flow 34 from the primary compressor 20, the signal indicative of power output by the semi-closed power cycle system 12, the signal indicative of the temperature of the gas flow 30 from the turbine 16, and the signal indicative of the mass flow balance within the semi-closed power cycle system 12. For example, in the illustrated embodiment, the controller 56 is communicatively coupled to inlet guide vanes 62 configured to regulate the flow of air 27 into the feed compressor 22. As will be appreciated, regulating the flow of air 27 into the feed compressor 22 will vary the flow of compressed air 25 into the combustor 14. In certain embodiments, the controller 56 may be configured to adjust the position of the guide vanes 62 based on the measured oxygen concentration within the extracted exhaust gas 35. For example, if the oxygen concentration is greater than desired, the controller 56 may partially close the inlet guide vanes 62 to restrict air flow through the feed compressor 22. Alternatively, the controller 56 may be configured to adjust the position of the guide vanes 62 based on the mass flow balance within the semi-closed power cycle system 12. For example, if the pressure of the extracted exhaust gas 35 is greater than desired, the controller 56 may partially close the inlet guide vanes 62 to restrict air flow through the feed compressor 22, thereby reducing the mass flow rate of air into the semi-closed power cycle system 12.

In certain embodiments, the oxygen concentration within the extracted exhaust gas 35 is calculated based on the fuel-air mixture ratio within the combustor 14. In such embodiments, the controller 56 may be configured to adjust the position of the guide vanes 62 based on the fuel-air mixture ratio. As previously discussed, it may be desirable to operate the combustor 14 at a stoichiometric fuel-air mixture ratio to substantially reduce the oxygen content of the exhaust gas. Consequently, if the quantity of compressed air 25 from the feed compressor 22 is greater than the quantity sufficient for complete combustion of the fuel 24, the controller 56 may adjust the guide vanes 62 to restrict flow through the feed compressor 22. Conversely, if the quantity of compressed air 25 from the feed compressor 22 is less than the quantity sufficient for complete combustion of the fuel 24, the controller 56 may adjust the guide vanes 62 to facilitate increased flow through the feed compressor 22.

The controller 56 is also communicatively coupled to inlet guide vanes 64 of the primary compressor 20 to regulate gas flow through the primary compressor 20. As will be appreciated, regulating the flow of gas 33 into the primary compressor 20 will vary the flow of compressed gas 34 to the turbine 16. In certain embodiments, the controller 56 may be configured to adjust the position of the guide vanes 64 based on the measured temperature of the gas through the turbine 16. For example, if the gas temperature is greater than desired, the controller 56 may open the inlet guide vanes 64 to increase gas flow through the primary compressor 20, thereby decreasing the temperature of the gas flow into the turbine 16.

In addition, the controller 56 is communicatively coupled to a valve 66 configured to regulate the flow of fuel 24 into the combustor 14. In certain embodiments, the controller 56 is configured to regulate flow through the valve 66 based on the power output of the semi-closed power cycle system 12. For example, if the power output is lower than desired, the controller 56 may open the valve 66, thereby increasing fuel flow to the combustor 14 and increasing power output. Alternatively, the controller 56 may be configured to regulate flow through the valve 66 based on the measured oxygen concentration within the extracted exhaust gas 35. For example, if the oxygen concentration is greater than desired, the controller 56 may increase fuel flow to the combustor 14, thereby transitioning the fuel-air mixture ratio toward the stoichiometric ratio.

Furthermore, the controller 56 is communicatively coupled to a valve 68 configured to regulate the fraction of exhaust gas 35 extracted from the primary compressor 20. In certain embodiments, the controller 56 is configured to regulate the flow through the valve 68 based on the mass flow balance within the semi-closed power cycle system 12. For example, if the pressure of the extracted exhaust gas 35 is greater than desired, the controller 56 may open the valve 68 to extract a larger quantity of exhaust gas 35 from the primary compressor 20. As a result, the discharge pressure of the primary compressor 20 will be reduced, thereby maintaining a desired operational pressure within the primary compressor 20. Alternatively, the controller 56 may be configured to regulate flow through the valve 68 based on the power output by the semi-closed power cycle system 12. For example, if the power output is greater than desired, the controller 56 may open the valve 68, thereby reducing flow through the turbine 16. Due to the connection between the turbine 16 and the load 28, reducing flow through the turbine 16 will decrease power to the load 28.

Figure 2:
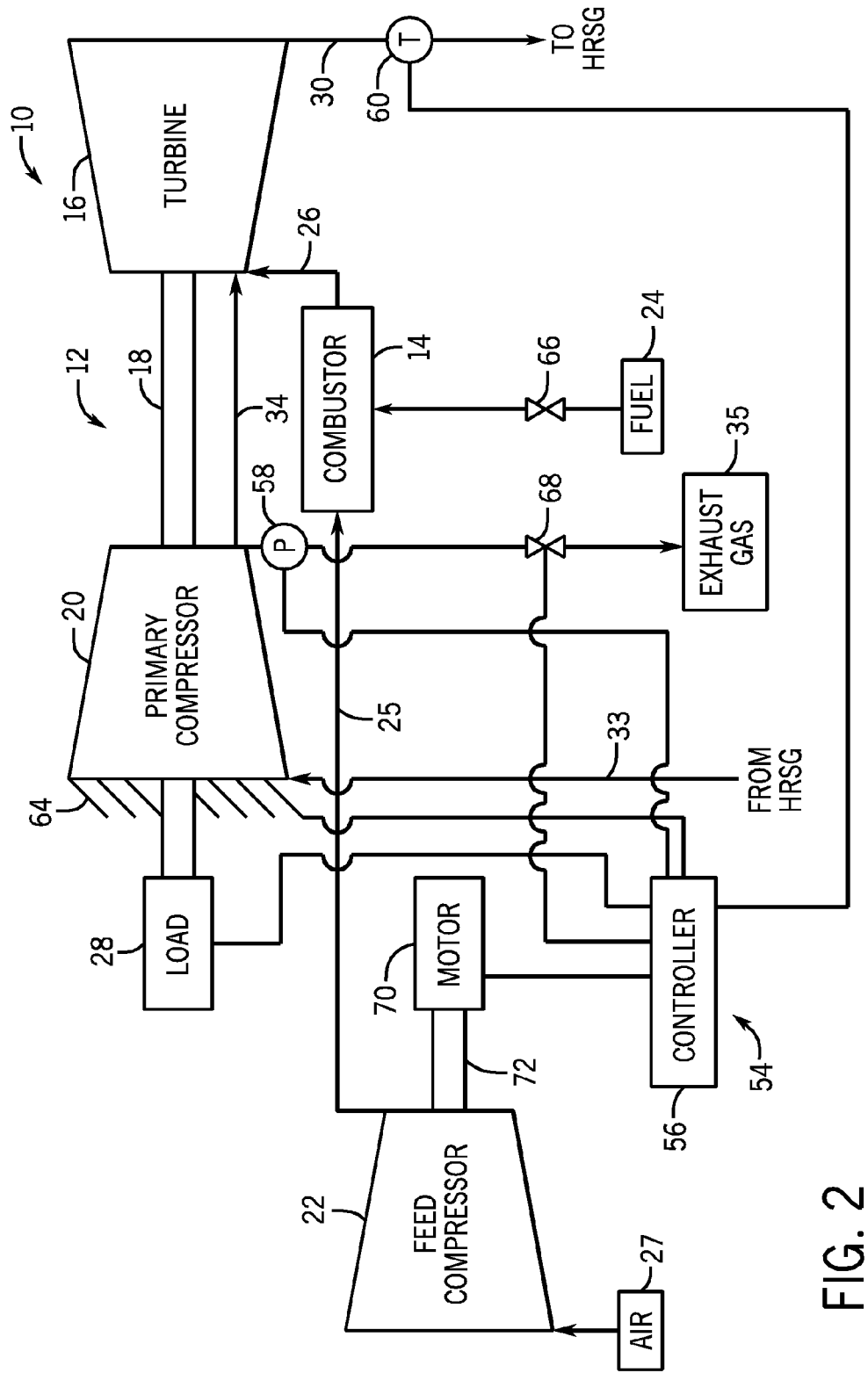
FIG. 2 is a schematic diagram of an alternative embodiment of a semi-closed power cycle system.

FIG. 2 is a schematic diagram of an alternative embodiment of a semi-closed power cycle system 12. In the illustrated embodiment, the semi-closed power cycle system 12 includes a motor 70 configured to drive the feed compressor 22 via a shaft 72. Accordingly, the feed compressor 22 is not directly coupled to the turbine 16, such as the feed compressor 22 of the semi-closed power cycle system 12 described above with reference to FIG. 1. The motor 70 may be any suitable device capable of driving the feed compressor 22. For example, the motor 70 may be an internal combustion engine, an electric motor, a steam turbine, or a gas turbine, among other motor configurations. In the present embodiment, the controller 56 is communicatively coupled to the motor 70 and configured to vary the air flow through the feed compressor 22 by adjusting the power output of the motor 70. For example, the controller 56 may be configured to adjust the motor 70 power output based on the measured oxygen concentration within the extracted exhaust gas 35. For example, if the oxygen concentration is greater than desired, the controller 56 may decrease power to the feed compressor 22 to reduce air flow to the combustor 14. Alternatively, the controller 56 may be configured to adjust the motor 70 power output based on the mass flow balance within the semi-closed power cycle system 12. For example, if the pressure of the extracted exhaust gas 35 is greater than desired, the controller 56 may decrease power to the feed compressor 22 to reduce air flow to the combustor 14. In further embodiments, the controller 56 may be configured to adjust the motor 70 power output based on a fuel-air mixture ratio within the combustor 14. For example, if the quantity of compressed air 25 from the feed compressor 22 is greater than the quantity sufficient for complete combustion of the fuel 24, the controller 56 will decrease power to the feed compressor 22 to reduce air flow to the combustor 14.

While the controller 56 is configured to regulate air flow to the combustor 14 by varying power output to the feed compressor 22 in the illustrated embodiment, it should be appreciated that alternative embodiments may include additional features configured to regulate the air flow. For example, in certain embodiments, the motor 70 may be configured to drive the feed compressor 22 at a constant speed. In such embodiments, the feed compressor 22 may include inlet guide vanes, such as those described above with reference to FIG. 1, to regulate air flow through the feed compressor 22. In further embodiments, the motor 70 power output may be adjustable and the feed compressor 22 may include inlet guide vanes. In such embodiments, the controller 56 may be configured to regulate air flow to the combustor 14 by adjusting the motor 70 power output and the position of the inlet guide vanes.

Figure 3:
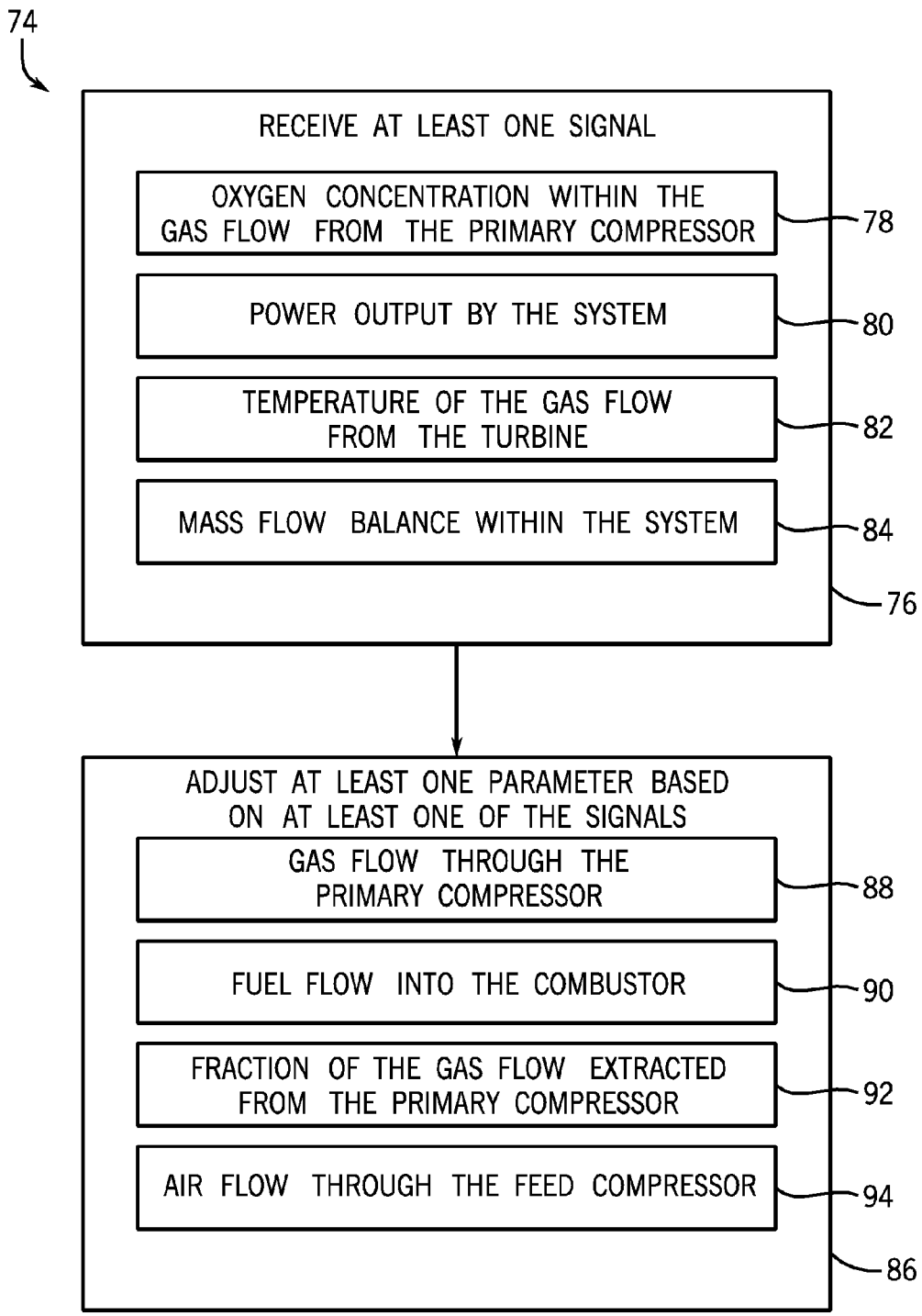
FIG. 3 is a flowchart of an embodiment of a method for controlling a semi-closed power cycle system.

FIG. 3 is a flowchart of an embodiment of a method 74 for controlling a semi-closed power cycle system 12. First, as represented by block 76, at least one signal indicative of an operational parameter of the semi-closed power cycle system 12 is received. As illustrated, the signals may include a first signal indicative of oxygen concentration within the gas flow 34 from the primary compressor 20, as represented by block 78; a second signal indicative of power output by the semi-closed power cycle system 12, as represented by block 80; a third signal indicative of temperature of the gas flow 30 from the turbine 16, as represented by block 82; and a fourth signal indicative of a mass flow balance within the semi-closed power cycle system 12, as represented by block 84. For example, the controller 56 may receive the signal indicative of the oxygen concentration within the gas flow 34 from the primary compressor 20 and the signal indicative of the mass flow balance within the semi-closed power cycle system 12 via the sensor 58. In addition, the controller 56 may receive the signal indicative of power output by the semi-closed power cycle system 12 from the load 28, and the signal indicative of the temperature of the gas flow 30 from the temperature sensor 60.

Next, as represented by block 86, at least one operational parameter of the semi-closed power cycle system 12 is adjusted based on at least one of the signals. As illustrated, the operational parameters include gas flow through the primary compressor 20, as represented by block 88; fuel flow into the combustor 14, as represented by block 90; fraction of the gas flow extracted from the primary compressor 20, as represented by block 92; and/or air flow through the feed compressor 22, as represented by block 94. For example, the controller 56 may be configured to adjust the position of the guide vanes 62 of the feed compressor 22 based on the measured oxygen concentration within the extracted exhaust gas 35. In addition, the controller 56 may be configured to adjust the position of the guide vanes 64 of the primary compressor 20 based on the measured temperature of the gas through the turbine 16. Furthermore, the controller 56 may be configured to regulate flow through the fuel valve 66 based on the power output by the semi-closed power cycle system 12. The controller 56 may also be configured to regulate the flow through the exhaust valve 68 based on the mass flow balance within the semi-closed power cycle system 12. In this manner, the controller 56 may efficiently operate the semi-closed power cycle system 12, while providing an exhaust gas flow 35 having an oxygen content substantially lower than gas turbine engines configured to operate with a fuel-lean mixture ratio. As a result, the exhaust gas 35 produced by the semi-closed power cycle system 12 may be well-suited for secondary recovery and/or carbon capture operations.

Technical effects of the disclosed embodiments include the ability to efficiently operate a semi-closed power cycle system by controlling various fluid flows within the semi-closed power cycle system. For example, certain semi-closed power cycle systems include a controller configured to receive a first signal indicative of an oxygen concentration within the gas flow from the primary compressor, and to adjust the air flow to the combustor based on the first signal. In further embodiments, the controller is configured to receive a second signal indicative of power output by the turbine, a third signal indicative of a temperature of the gas flow through the turbine, and a fourth signal indicative of a mass flow balance within the system. The controller is also configured to adjust the air flow to the combustor, to adjust the gas flow into the primary compressor, to adjust a fuel flow into the combustor, and to adjust the fraction of the gas flow extracted from the primary compressor based on the first signal, the second signal, the third signal, and the fourth signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a controller configured to control a semi-closed power cycle system, wherein the controller is configured to receive at least three signals from a first group comprising a first signal indicative of an oxygen concentration within a first gas flow through a primary compressor, a second signal indicative of power output by the semi-closed power cycle system, a third signal indicative of a temperature of a second gas flow through a turbine, and a fourth signal indicative of a mass flow balance within the semi-closed power cycle system, and wherein the controller is configured to adjust at least three parameters from a second group comprising the first gas flow through the primary compressor, a fuel flow into a combustor, a fraction of the first gas flow extracted from the primary compressor, and an air flow through a feed compressor based on the at least three signals.

2. The system of claim 1, wherein the controller is configured to receive the first signal, the second signal, the third signal and the fourth signal, and to adjust the first gas flow through the primary compressor, the fuel flow into the combustor, the fraction of the first gas flow extracted from the primary compressor, and the air flow through the feed compressor based on the first signal, the second signal, the third signal, and the fourth signal.

3. The system of claim 2, wherein the controller is configured to adjust the first gas flow through the primary compressor based on the third signal, to adjust the fuel flow into the combustor based on the second signal, to adjust the fraction of the first gas flow extracted from the primary compressor based on the fourth signal, and to adjust the air flow through the feed compressor based on the first signal.

4. The system of claim 2, wherein the controller is configured to adjust the first gas flow through the primary compressor based on the third signal, to adjust the fuel flow into the combustor based on the first signal, to adjust the fraction of the first gas flow extracted from the primary compressor based on the second signal, and to adjust the air flow through the feed compressor based on the fourth signal.

5. The system of claim 1, wherein the fourth signal indicative of the mass flow balance within the semi-closed power cycle system comprises a signal indicative of a discharge pressure of the primary compressor.

6. The system of claim 1, wherein the controller is configured to receive the first signal, and to adjust the air flow through the feed compressor based on the first signal.

7. The system of claim 1, wherein the controller is configured to adjust the first gas flow through the primary compressor by adjusting a position of inlet guide vanes of the primary compressor.

8. The system of claim 1, wherein the controller is configured to adjust the air flow through the feed compressor by adjusting a position of inlet guide vanes of the feed compressor.

9. The system of claim 1, comprising:
the combustor configured to combust a fuel-air mixture;
the feed compressor in fluid communication with the combustor and configured to provide the air flow to the combustor;
the turbine in fluid communication with the combustor and configured to receive the second gas flow from the combustor; and
the primary compressor in fluid communication with the turbine and configured to compress the first gas flow.

10. The system of claim 1, comprising a heat recovery steam generator configured to extract heat from the second gas flow and to provide the first gas flow to the primary compressor.

11. A system comprising:
- a combustor configured to combust a fuel-air mixture;
- a feed compressor in fluid communication with the combustor and configured to provide an air flow to the combustor;
- a turbine in fluid communication with the combustor and configured to receive a first gas flow from the combustor;
- a primary compressor in fluid communication with the turbine and configured to receive a second gas flow from the turbine, to compress the second gas flow, and to provide a third gas flow to the turbine, wherein a fraction of the third gas flow is extracted from the primary compressor; and
- a controller configured to receive a first signal indicative of an oxygen concentration within the third gas flow, and to adjust the air flow to the combustor based on the first signal.

12. The system of claim 11, wherein the first signal indicative of the oxygen concentration within the third gas flow is based on a ratio of the fuel-air mixture.

13. The system of claim 11, wherein the controller is configured to receive a second signal indicative of power output by the turbine, a third signal indicative of a temperature of the first gas flow or the second gas flow, and a fourth signal indicative of a mass flow balance within the system, and wherein the controller is configured to adjust the air flow to the combustor, to adjust the second gas flow into the primary compressor, to adjust a fuel flow into the combustor, and to adjust the fraction of the third gas flow extracted from the primary compressor based on the first signal, the second signal, the third signal, and the fourth signal.

14. The system of claim 13, wherein the controller is configured to adjust the second gas flow into the primary compressor based on the third signal, to adjust the fuel flow into the combustor based on the second signal, to adjust the fraction of the third gas flow extracted from the primary compressor based on the fourth signal, and to adjust the air flow to the combustor based on the first signal.

15. The system of claim 13, wherein the controller is configured to adjust the second gas flow into the primary compressor based on the third signal, to adjust the fuel flow into the combustor based on the first signal, to adjust the fraction of the third gas flow extracted from the primary compressor based on the second signal, and to adjust the air flow to the combustor based on the fourth signal.

16. A method for controlling a semi-closed power cycle system comprising:
- receiving at least three signals from a first group comprising a first signal indicative of an oxygen concentration within a first gas flow through a primary compressor, a second signal indicative of power output by the semi-closed power cycle system, a third signal indicative of a temperature of a second gas flow through a turbine, and a fourth signal indicative of a mass flow balance within the semi-closed power cycle system; and
- adjusting at least three parameters from a second group comprising the first gas flow through the primary compressor, a fuel flow into a combustor, a fraction of the first gas flow extracted from the primary compressor, and an air flow through a feed compressor based on the at least three signals.

17. The method of claim 16, comprising receiving the first signal, the second signal, the third signal and the fourth signal, and adjusting the first gas flow through the primary compressor, the fuel flow into the combustor, the fraction of the first gas flow extracted from the primary compressor, and the air flow through the feed compressor based on the first signal, the second signal, the third signal, and the fourth signal.

18. The method of claim 17, comprising adjusting the first gas flow through the primary compressor based on the third signal, adjusting the fuel flow into the combustor based on the second signal, adjusting the fraction of the first gas flow extracted from the primary compressor based on the fourth signal, and adjusting the air flow through the feed compressor based on the first signal.

19. The method of claim 17, comprising adjusting the first gas flow through the primary compressor based on the third signal, adjusting the fuel flow into the combustor based on the first signal, adjusting the fraction of the first gas flow extracted from the primary compressor based on the second signal, and adjusting the air flow through the feed compressor based on the fourth signal.

20. The method of claim 16, comprising receiving the first signal, and adjusting the air flow through the feed compressor based on the first signal.

* * * * *